United States Patent
Aryeh

(10) Patent No.: US 9,150,082 B2
(45) Date of Patent: Oct. 6, 2015

(54) AUTOMOBILE WINDSHIELD VISOR

(71) Applicant: Raffie Raffiel Aryeh, Newtown, CT (US)

(72) Inventor: Raffie Raffiel Aryeh, Newtown, CT (US)

(*) Notice: Subject to any disclaimer, the term of this patent is extended or adjusted under 35 U.S.C. 154(b) by 0 days.

(21) Appl. No.: 14/494,129

(22) Filed: Sep. 23, 2014

(65) Prior Publication Data
US 2015/0115645 A1 Apr. 30, 2015

Related U.S. Application Data

(60) Provisional application No. 61/881,182, filed on Sep. 23, 2013.

(51) Int. Cl.
*B60J 3/00* (2006.01)
*B60J 3/02* (2006.01)

(52) U.S. Cl.
CPC .............. *B60J 3/0208* (2013.01); *B60J 3/0213* (2013.01); *B60J 3/0278* (2013.01)

(58) Field of Classification Search
CPC ....... B60J 3/0208; B60J 3/0278; B60J 3/0213
See application file for complete search history.

(56) References Cited

U.S. PATENT DOCUMENTS

| | | | | |
|---|---|---|---|---|
| 3,480,322 | A * | 11/1969 | Pollak | 296/97.8 |
| 4,736,979 | A * | 4/1988 | Harvey | 296/97.6 |
| 5,678,880 | A * | 10/1997 | Keller | 296/97.6 |
| 5,842,748 | A | 12/1998 | Cummins | |
| 5,938,026 | A | 8/1999 | Thorn | |
| 6,264,265 | B1 * | 7/2001 | Hestehave et al. | 296/97.6 |
| 6,402,221 | B1 | 6/2002 | Ogunjobi | |

OTHER PUBLICATIONS

"Easy View HD As Seen on TV Visor Sun Glare Blocker Flip Fold Down Clip on New", Ebay.com, Sep. 2014 (2 pages).
"Easy View XT", www.easyviewxt.com, Sep. 2014 (2 pages).
"Anti-Glare View Sun Visor Shade", Amazon.com, Sep. 2014 (5 pages).
"Sun Visor Extender", www.walterdrake.com/buy-sun-visor-extender-310599, Sep. 2014 (1 page).
"Trillium Sun Zapper", www.walmart.com/ip/Trillium-Sun-Zapper-Beige/24183249, Sep. 2014 (1 page).

* cited by examiner

*Primary Examiner* — Lori L Lyjak

(57) ABSTRACT

An adjustable automobile visor is provided with a cover section to reduce the brightness of or block sunlight or oncoming headlights when the visor is extended and an attachment section to attach and secure the visor to the automobile shade. The visor is made from a single piece of material. The cover section of the visor is in the form of a plate or sheet and the attachment section extends from the cover section. The visor attachment section includes a series of folds or hinges, which aid in securing the visor to the automobile shade and in the rotation of the visor.

9 Claims, 4 Drawing Sheets

AUTOMOBILE WINDSHIELD VISOR

CROSS-REFERENCE TO RELATED APPLICATIONS

This application claims the benefit of U.S. Provisional Application No. 61/881,182 filed Sep. 23, 2013, which is hereby incorporated by reference in its entirety.

FIELD OF THE INVENTION

The present invention relates to an automobile windshield visor for use in combination with a pre-existing visor or shade built into an automobile.

BACKGROUND OF THE INVENTION

In most standard automobiles, a rotatable visor or shade is secured to the ceiling of the interior of the automobile on the driver and passenger sides. When not in use, the shades rest against the ceiling of the interior of the automobile, but when in use, these shades allow the person in the car to rotate the visor downwardly, and also to the side, in order to block sunlight from the driver's or passenger's eyes which may be shining through the front windshield or side window.

However, in many instances, the built-in shades are insufficient because they cover a very small area of the window or windshield, and may not block sunlight as needed. Additionally, these shades have no transparency, such that the shade blocks out not only sunlight, but everything else on the other side of the shade that would otherwise be in the driver's line of sight, thus reducing the driver's available field of vision. As a result, these shades are also not capable of reducing the brightness of the headlights of an oncoming car without blocking the car from sight. It is an object of the present invention to address these problems in the art, by providing an improved, additional visor for use in combination with a preexisting automobile shade.

SUMMARY OF THE INVENTION

According to the present invention, an apparatus for use as an adaptable, automobile windshield visor is provided that is securable to an automobile's existing shade.

According to an embodiment of the invention, the visor according to the invention comprises a cover section configured to reduce the brightness of sunlight or oncoming car's headlights when the visor is extended and an attachment section configured to attach and secure the visor to the automobile shade. The visor according to the invention is made from a single piece of material. The cover section of the visor is in the form of a plate or sheet and the attachment section extends from the cover section along the entire length of the cover section.

The visor attachment section comprises a plurality of folds or hinges, which aid in securing the visor to the automobile shade and aid in the rotation of the visor towards and away from the automobile shade. A U-shaped fold can be made along two of the hinges to form the attachment section to wrap and secure the visor to the automobile shade. Depending on the width of the automobile visor, the visor can be folded along the two hinges that provide the best fit of the visor onto the automobile shade. The U-shaped attachment section extends along the length of the visor on both sides of the automobile shade in order to secure the visor to the automobile shade by compression, and further comprises two elongated extensions on each end of the attachment section which aid in securing the visor to the automobile shade. The elongated extensions may also comprise a hook-and-loop fastener configured to be affixed to a corresponding hook-and-loop fastener, which may be attached to or preexisting on the automobile shade.

The cover section of the visor is configured to be extended away from or towards the automobile shade by rotating the cover along one of the hinges on the visor. The cover section can be rotated into an extended state forming an angle between 0 and 90 degrees between the cover section and the automobile shade, so that it can be used to block or reduce the brightness of sunlight or oncoming headlights from a driver's or passenger's line of sight.

In a preferred embodiment, the visor is made from a flexible, polycarbonate material, but in alternative embodiments, it may also be made of a durable and flexible polyvinyl plastic, polyethylene or acrylic, or similar materials. In a preferred embodiment, the visor or the visor cover, comprises pin-hole sized perforations which aid in allowing improved vision by blocking out light without fully obscuring vision through the visor. However, the visor can also be tinted and have different shades or colors. The cover may also be formed of a material responsive to light, having transition characteristics that change the tinting of the material with exposure to light. For example, if the visor is in use, in the event of a rapid change in the amount of light, the tinting of the visor can change so as to either be less tinted if there is less light present or more tinted or more transparent if there is more light present. The visor according to the invention may also be coated with an antiglare coating or an antireflective material, such as metallic particles, to reduce glare.

For purposes of clarity, the noun "visor" is primarily used herein to refer to the visor according to the present invention and the noun "shade" is used herein to refer to an automobile shade or visor that is preexisting in most standard automobiles. Although these different terms are used herein to aid in distinguishing these two separate elements in the description, these terms may still be considered otherwise synonymous, and the visor of the present invention may be considered a "shade" and automobile shade may be considered to be a "visor".

DETAILED DESCRIPTION OF THE INVENTION

The present invention is described in further detail below with reference made to FIGS. 1-7.

Figure 1:
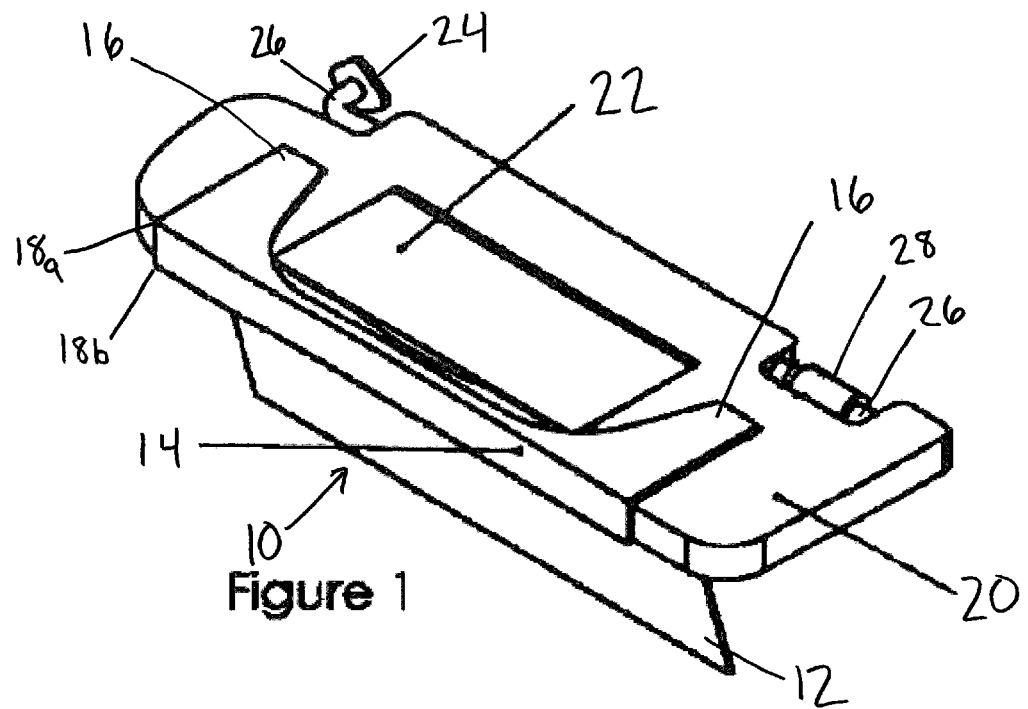
FIG. 1 shows a first view of a first embodiment of the visor according to the present invention in combination with an automobile shade.

According to an embodiment of the present invention, a visor 10 is provided for use in combination with an existing automobile shade 20, the type of which is provided as a standard feature in the interior of most automobiles above the driver seat and passenger seat. For example, as shown in FIG. 1, the standard automobile shade may include a mirror 22 and utilizes an attachment means 24 that is connected to a rod 26 inserted through the shade 20 to attach the shade 20 to the ceiling inside the automobile. The shade 20 is rotatable about the rod 26, such that the driver or passenger can lower the shade 20 to block sunlight or oncoming headlights from the driver's or passenger's line of sight. The rod 26 may also be detachable from a second attachment means 28 which is affixed to the automobile ceiling in order to allow the shade 20 to pivot 90 degrees about the attachment means 24 to block sunlight that may entering the driver's or passenger's line of sight from a side window.

As shown in FIGS. 1-7, the visor 10 according to the invention includes a cover section 12 and an attachment section 14. The cover section 12 is configured in the form of a plate. The attachment section 14 is substantially U-shaped so that the automobile shade 20 can be inserted through the attachment section 14 and compressed therein to be secured to the visor 10. The attachment section 14 may include a pair of elongated extensions 16. Each end of the attachment section 14 includes an elongated extension 16 extending therefrom, which further aid in compressing the automobile shade 20 into the attachment section 14. By positioning the elongated extensions 16 on each end of the attachment section 14, a space is provided between the elongated extensions 16 that makes accessible the mirror 22 on the automobile shade 20. As a result, the visor 10 does not interfere with the use of the mirror 22. The elongated extensions 16 may further include means for further securing the visor 10 to the automobile shade 20, such as a hook and loop fastener that is configured for use with a corresponding hook and loop fastener that may be attached to the automobile shade 20, or with the automobile shade 20 itself if the automobile shade 20 is made from a material that can be serve as a hook and loop fastener material.

The visor 10, including cover section 12 and attachment section 14 is made from a single piece of flexible material. In a preferred embodiment, the visor 10 is made from a flexible polycarbonate material, but it may also be made of a durable polyvinyl plastic, polyethylene or acrylic, or similar materials. The visor 10 has a preferred thickness of between 1 millimeter and 2.5 millimeters and a preferred length L (FIG. 3) of approximately 12 inches, but the present invention is not limited to these particular dimensions and the dimensions can vary as appropriate.

When the visor 10 is not in use or secured to an automobile shade 20, the visor 10 can be flattened into a single plane. The visor 10 includes a plurality of hinges 18a, 18b, 18c, 18d that are configured as creases or fold lines created in the visor 10.

Figure 2:
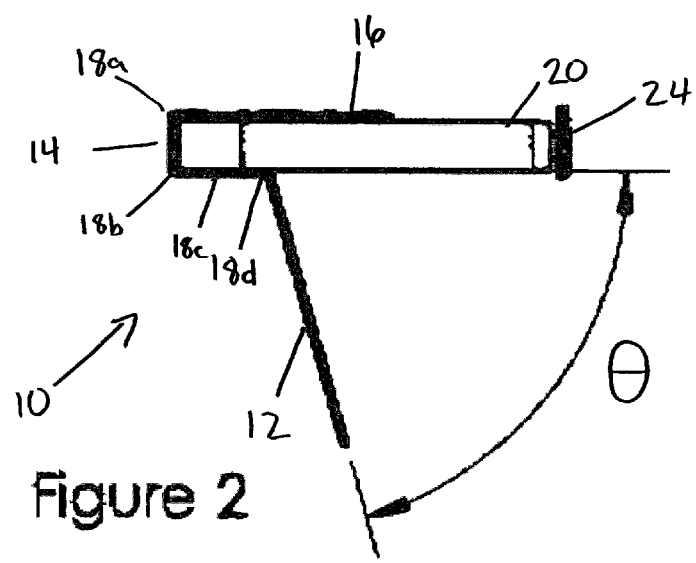
FIG. 2 shows a second view of a first embodiment of the visor according to the present invention in combination with an automobile shade.
Figure 3:
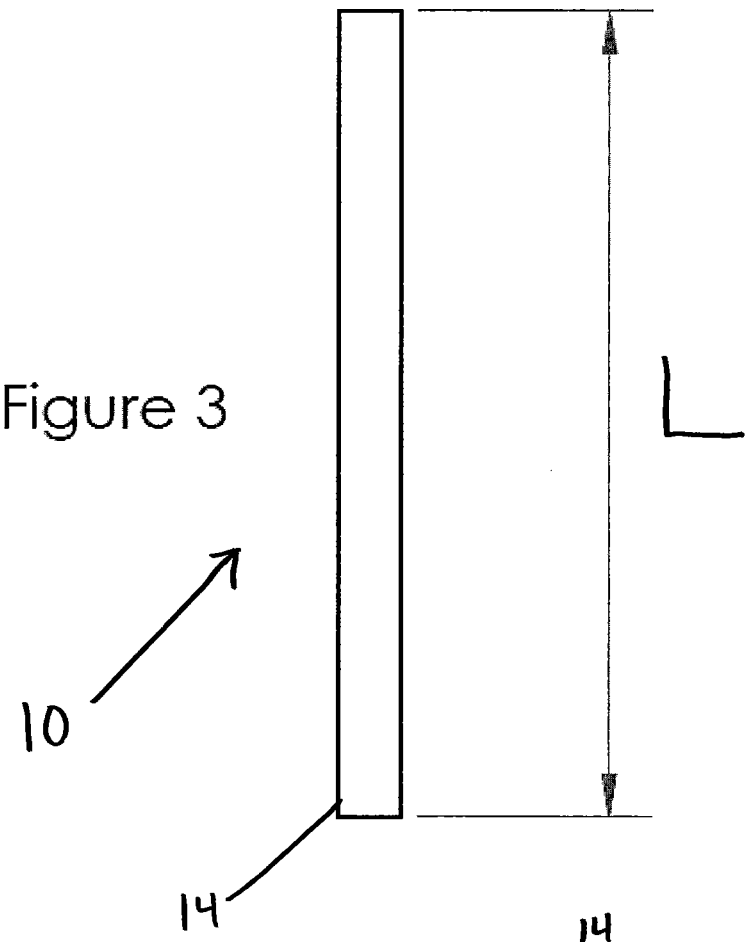
FIG. 3 shows a first, lengthwise view of a first embodiment of the visor according to the present invention.
Figure 4:
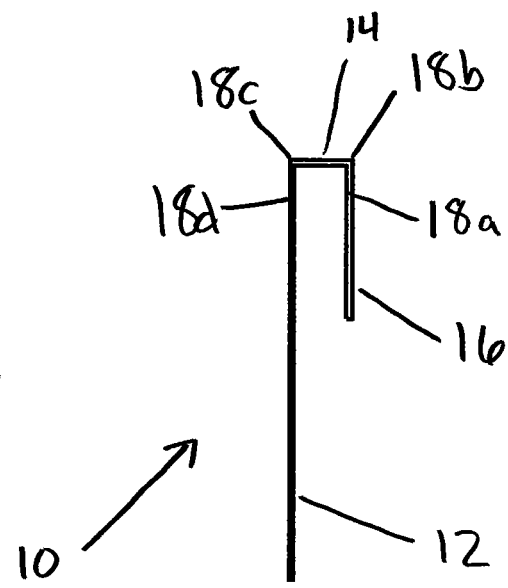
FIG. 4 shows a second, side view of a first embodiment of the visor according to the present invention.
Figure 5:
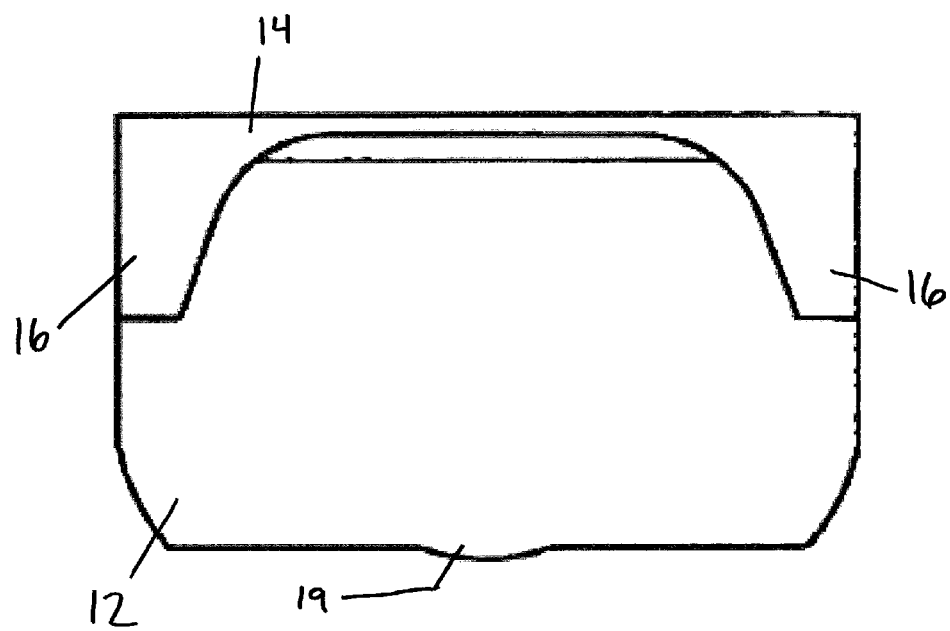
FIG. 5 shows a third view of a first embodiment of the visor according to the present invention.
Figure 6:
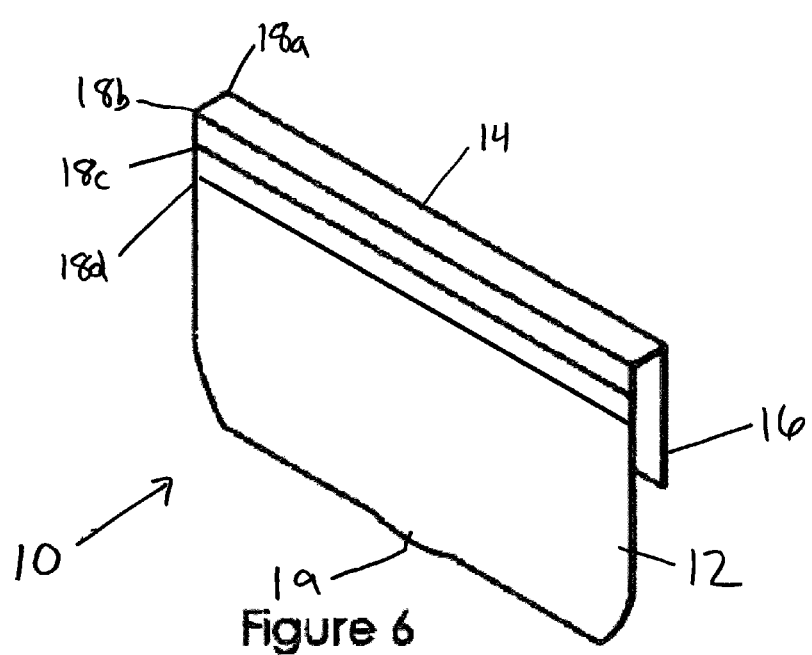
FIG. 6 shows a perspective view of a first embodiment of the visor according to the present invention.
Figure 7:
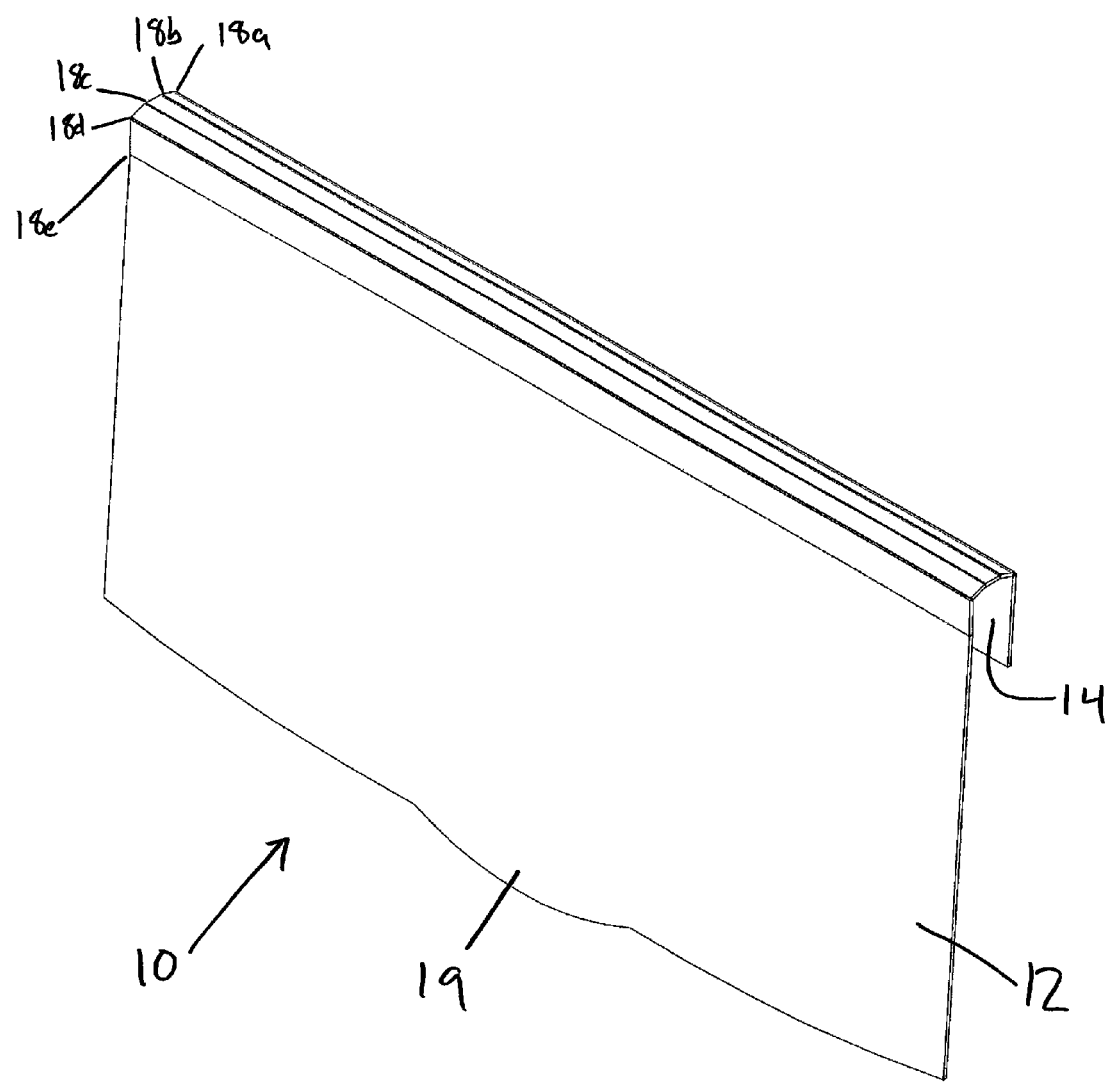
FIG. 7 shows a perspective view of a second embodiment of the visor according to the present invention.

To form the U-shaped attachment section 14, the visor 10 is folded along two of the plurality of hinges 18a, 18b, 18c, 18d. The particular hinges 18a, 18b, 18c, 18d that are folded to created the attachment section 14 can vary depending on the width of the automobile shade 20 and the desired length of the cover 12 that the user wishes to have. For example, FIGS. 1 and 2 show the attachment member 14 as being formed by the folding of the visor 10 upon hinges 18a and 18b, which are adjacent hinges. To accommodate a wider automobile shade 20, the folding of the visor 10 could be made between non-adjacent hinges (e.g., hinge 18a and 18b) or between two hinges with a greater distance therebetween. Further, if the driver or passenger using the visor 10 wishes to shorten the length of the cover 12 that would be used to block sunlight or oncoming headlights, the attachment section 14 can be formed by folding the visor 10 upon two hinges that do not include the hinge 18a furthest from the base of the cover 12. For example, the configuration shown in FIG. 4, the visor 10 has been folded along hinges 18b and 18c, which shortens the length of the cover 12 relative to folding the visor 10 as shown in FIGS. 1 and 2 along hinges 18a and 18b.

When the visor 10 is folded to form the U-shaped attachment section 14, the visor 10 takes the shape shown in FIGS. 4-7 for example, from which the visor 10 can be attached onto the automobile shade 20. When attached to the automobile shade 20, the cover 12 can be extended downwardly away from the automobile shade 20 by folding the cover 12 along one of the plurality of hinges in order to block sunlight or oncoming headlights from the user's line of sight. For example, as shown in FIGS. 1 and 2, the cover 12 is extended away from the automobile shade 20 by rotating the cover 12 downwardly at hinge 18d. The cover 12 can be rotated to an angle θ that is between 0 and 90 degrees relative to the automobile shade 20. A tab 19 can be provided on the cover 12 to aid the user in rotating the cover 12. When the cover 12 is no longer required, the cover 12 can be rotated back towards the automobile shade 20. The side of the cover 12 facing the automobile shade 20 may include means for further securing the cover 12 to the automobile shade 20, such as a hook and loop fastener that is configured for use with a corresponding hook and loop fastener that may be attached to the automobile shade 20, or with the automobile shade 20 itself if the automobile shade 20 is made from a material that can be serve as a hook and loop fastener material.

By using the visor 10 that is made from a single piece of material and configured as described above, when the visor 10 is in use, there is no space present between the cover 12 and the attachment section 14 that would allow sunlight or oncoming headlights to enter through because the attachment section 14 extends continuously out from and along the entire length of the cover 12.

The number of hinges 18 that are provided on the visor 10 and the space provided between hinges 18 can vary. For example, in FIG. 7, an embodiment of the visor 10 comprising five hinges 18a, 18b, 18c, 18d, 18e is shown, and in further embodiments, the visor may have more or less hinges. Further, it is further envisioned that the distance between hinges may vary on a single visor 10 to accommodate for a wider range of dimensions that may be necessary to the user.

In a preferred embodiment, the visor 10, or at least the cover 12, comprises pin-hole sized perforations which aid in reducing the brightness of sunlight or oncoming headlights while still allowing a level of visibility through the cover 12. However, the visor 10 can also be colored, tinted or formed from a tinted material to reduce the amount of light that passes through the cover 12, while still allowing a level of visibility through the cover 12. In one embodiment, the visor 10, or at least the cover 12, also be formed of a material responsive to light, having transition characteristics that change the tinting of the material with exposure to light. With this material, if the visor 10 is in use, in the event of a rapid change in the amount of light hitting the visor, the tinting of the cover 12 can change so as to either be less tinted if there is less light present or more tinted if there is more light present. The visor 10 or only the cover 12 may also be coated with an anti reflective material, such as metallic particles, to reduce glare.

According to an alternative embodiment of the invention, the visor 10 according to the invention may be used for other purposes. For example, the visor 10 can be used to cover an article, such as a document, photograph, piece of poster board or an easel. The attachment section 14 is configured to allow the visor 10 to be hung on top of and cover the article. The hinges 18 allow the width of the attachment section 14 to be adjustable in order to configure the width of the attachment section 14 to fit the object that is to be covered. The cover 12 is configured to be raised by lifting it away from the article being covered. In this embodiment, the cover 12 may be clear, transparent, tinted or have perforations.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed:

1. An apparatus for use as a visor to reduce the brightness of oncoming light in an automobile comprising:
    a cover section in the form of a plate configured to act as a visor to reduce the brightness of or block oncoming light;
    a U-shaped attachment section extending along the length of the cover section configured to secure the apparatus to an automobile windshield shade and further comprising a plurality of hinges configured to allow the attachment section to be folded into variable widths and configured to permit the rotation of the cover section upon one or more of the plurality of hinges; and
    two elongated extensions, each extending from an end of the attachment section with a space provided between the two elongated extensions.

2. The apparatus according to claim 1, wherein the apparatus is made from a single piece of flexible polycarbonate material.

3. The apparatus according to claim 2, wherein at least the cover comprises perforations to reduce the brightness of light passing through the cover while allowing visibility through the cover.

4. The apparatus of claim 1, wherein the attachment section is configured to compress the automobile shade within the U-shaped attachment section to secure the automobile shade therein.

5. The apparatus according to claim 4, wherein the elongated extensions comprise a hook and loop fastener configured to mate with a corresponding hook and loop fastener secured to the automobile windshield shade.

6. The apparatus according to claim 1, wherein at least the cover is coated a material to reduce glare.

7. The apparatus according to claim 1, wherein at least the cover is made from a material that is reactive to light and is configured to change the amount of tinting based on the amount of light received by the cover.

8. The apparatus according to claim 1, wherein the cover is configured to be rotatable away from the automobile windshield shade between an angle of 0 and 90 degrees.

9. The apparatus according to claim 1, wherein the attachment section is configured to contact both of two sides of the automobile windshield shade along the entire length of the apparatus.

* * * * *